(12) United States Patent
Neuman

(10) Patent No.: US 8,131,108 B2
(45) Date of Patent: Mar. 6, 2012

(54) METHOD AND SYSTEM FOR DYNAMIC CONTRAST STRETCH

(75) Inventor: Darren Neuman, Palo Alto, CA (US)

(73) Assignee: Broadcom Corporation, Irvine, CA (US)

( * ) Notice: Subject to any disclaimer, the term of this patent is extended or adjusted under 35 U.S.C. 154(b) by 1323 days.

(21) Appl. No.: 11/376,646

(22) Filed: Mar. 15, 2006

(65) Prior Publication Data

US 2006/0239581 A1 Oct. 26, 2006

Related U.S. Application Data

(60) Provisional application No. 60/673,896, filed on Apr. 22, 2005.

(51) Int. Cl.
*G06K 9/00* (2006.01)
*G06K 9/40* (2006.01)

(52) U.S. Cl. .......................... 382/274; 382/167

(58) Field of Classification Search .................. None
See application file for complete search history.

(56) References Cited

U.S. PATENT DOCUMENTS

| | | | | |
|---|---|---|---|---|
| 5,224,177 A | * | 6/1993 | Doi et al. | 382/168 |
| 5,982,926 A | * | 11/1999 | Kuo et al. | 382/167 |
| 6,026,181 A | * | 2/2000 | Murakami | 382/168 |
| 6,038,341 A | * | 3/2000 | Takeshima et al. | 382/168 |
| 6,236,751 B1 | * | 5/2001 | Farrell | 382/168 |
| 6,351,558 B1 | * | 2/2002 | Kuwata | 382/168 |
| 6,906,826 B1 | * | 6/2005 | Kuwata et al. | 358/1.9 |
| 6,915,024 B1 | * | 7/2005 | Maurer | 382/274 |
| 7,242,800 B2 | * | 7/2007 | Iguchi et al. | 382/167 |
| 7,245,781 B2 | * | 7/2007 | Gallagher et al. | 382/274 |
| 7,386,185 B2 | * | 6/2008 | Watanabe et al. | 382/274 |
| 7,424,148 B2 | * | 9/2008 | Goh | 382/169 |
| 7,426,299 B2 | * | 9/2008 | Yamazoe et al. | 382/167 |
| 7,551,794 B2 | * | 6/2009 | Masuno et al. | 382/264 |
| 2002/0034336 A1 | * | 3/2002 | Shiota et al. | 382/274 |
| 2005/0031201 A1 | * | 2/2005 | Goh | 382/169 |
| 2005/0157939 A1 | * | 7/2005 | Arsenault et al. | 382/260 |
| 2005/0180629 A1 | * | 8/2005 | Masuno et al. | 382/169 |

OTHER PUBLICATIONS

Gonzalez et al, Digital Image Processing, 2002 by Prentice-Hall Inc. Chapter 3.*

* cited by examiner

*Primary Examiner* — Yuzhen Ge
(74) *Attorney, Agent, or Firm* — Thomas, Kayden, Horstemeyer & Risley, LLP.

(57) ABSTRACT

Aspects of a system and method for processing an image are presented. The method may comprise stretching contrast of an input image based on a distribution of luma values for the input image and a distribution of luma values for a desired output image. The pixels below a specified level of contrast defined by the distribution of luma values for the input image and the distribution of luma values for the desired output image are substantially stretched. The method may also comprise constructing a lookup table of the desired output luma values and stretching a contrast of the input image using the constructed lookup table. The method may also comprise applying linear function and a non-linear function to the distribution of luma values, and applying a stretch factor above a specified level of the distribution and a stretch factor below a specified level of the distribution.

24 Claims, 10 Drawing Sheets

METHOD AND SYSTEM FOR DYNAMIC CONTRAST STRETCH

RELATED APPLICATIONS

This patent application makes reference to, claims priority to and claims benefit from U.S. Provisional Patent Application Ser. No. 60/673,896, entitled "Method and System for Dynamic Contrast Stretch," filed on Apr. 22, 2005, the complete subject matter of which is hereby incorporated herein by reference, in its entirety.

This patent application makes reference to U.S. patent application Ser. No. 11/026,369, filed Dec. 30, 2004, which is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to processing of video. More specifically, certain embodiments of the invention relate to a method and system for dynamic contrast stretch.

BACKGROUND OF THE INVENTION

In video displays, a relationship exists between overall scene brightness and contrast. Typical displays have a contrast ratio around 100:1, or slightly higher. The human eye may adapt to a range of luminance of about 200,000:1, and at any particular adaptation level, the human eye is sensitive to a linear contrast over a luminance range of 300:1. Representing real images on a limited contrast medium such as film or video requires adjustments at authoring time to compose the overall scene brightness in a manner which appears to the eye as a dark scene or a light scene. This takes advantage of the eye's natural ability to adapt to its surroundings. Assuming that the video or film is a dominant part of the viewing area for the eye, the impression of a dark scene may be given with a video composition of mostly dark pixels. Similarly, the impression of a daylight scene may be given with a video composition of mostly white pixels.

When compared to actual daylight, or actual night, television is nowhere near as dark as the human eye can see in a dark room, nor can a television be anywhere near as bright as full daylight. In video, the absolute luminance of the original scene is rarely reproduced. In reality a relative luminance, which is proportional to the scene luminance, is reproduced. By using the adaptive capabilities in the human eye, film directors and video equipment attempt to provide a relative contrast. Viewers then adapt to white levels in their ambient environment, and respond to delta luma values as relative contrast in the ambient environment.

For example, in an extreme dark scene, with most pixels skewed toward the black end of the distribution of the luma spectrum, the eye is less sensitive to contrast. The overall power response curve of the eye increases, and boosting near white pixels increases spectral highlights and the appearance of sharpness.

As another example, in an extreme bright scene, with most pixels skewed toward the white end of the distribution, the eye is more sensitive to contrast. The overall power response curve of the eye decreases, and boosting near white does little or nothing. However, boosting contrast near black increases the relative contrast ratio, and the impression of sharpness.

If the source is composed well, the black level, white level and overall scene contrast are set well, and require little adjustment. This is also true of high-contrast content: daylight scenes, live action, and normal viewing environments. In other scenes such as film noir, low-contrast scenes, foggy or cloudy scenes, and old film movies, the contrast may not be well adjusted, or sometimes viewers may prefer higher contrast scenes. In such cases, it is necessary to increase contrast in a way that takes advantage of the eye's ability to adapt to scene brightness, but this may be done so as not to change the overall scene composition as desired by the original film director.

A histogram may be used to illustrate luma statistics, where the x-axis represents the brightness value of a pixel, which ranges from 0 (black) to 255 (white), and the y-axis represents the number of pixels. Examination of the histogram may give a general idea of the brightness of a frame. For example, in darker images, the histogram will be skewed to the left, where most of the pixels will be dark and closer to 0 (black), and vice versa for bright frames. Often, contrast stretch is applied to videos to achieve brightness more desirable by viewers.

Prior technology implemented a static contrast stretch independent of the histogram of an image, and where image information was available, usually only a single black stretch was performed based on the minimum level of the image. Prior algorithms did not have good mechanisms to prevent over-stretching, did not have mechanisms to adjust the contrast stretch for very narrow or skewed distribution images, or did not have mechanisms to perform a non-linear stretch to adapt to the power law response curve of the eye.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for dynamic contrast stretch, substantially as shown in and/or described in connection with at least one of the figures, as set forth more completely in the claims.

These and other features and advantages of the present invention may be appreciated from a review of the following detailed description of the present invention, along with the accompanying figures in which like reference numerals refer to like parts throughout.

DETAILED DESCRIPTION OF THE INVENTION

Certain embodiments of the invention may be found in a method and system for dynamic contrast stretch in a video system. Various aspects of the invention may comprise methods and systems for an algorithm that may dynamically adapt contrast to the content of the video. The algorithm may utilize a luma adjustment block in a video network (VN). One aspect of the invention may provide usage specification for dynamic contrast stretch. In one embodiment of the invention, an amount of contrast stretch may be determined based on a distribution of luma values for an image. A luma adjustment block table may be utilized to facilitate dynamic contrast stretch. The algorithm may adapt to an image in real-time using a histogram and a contrast stretch function. The algorithm may also update a lookup table that may allow any contrast stretch function to be mapped, including curved responses.

An exemplary method for dynamic contrast stretch may comprise performing a measurement on an input image histogram, computing limits on the amount of linear stretch, and computing a linear stretch to contrast stretch the image. In certain cases where an image may have a skewed distribution, for example, when an image is predominantly dark, a non-linear stretch may be applied to increase contrast of near-white pixels. In this regard, bright images may be given a non-linear stretch to increase the contrast of near-black pixels. The result of the stretch may in some cases result in a shift in the image brightness, and an adjustment may be made to increase chroma saturation if the image is brightened, or to decrease saturation if the image is darkened.

Figure 1A:
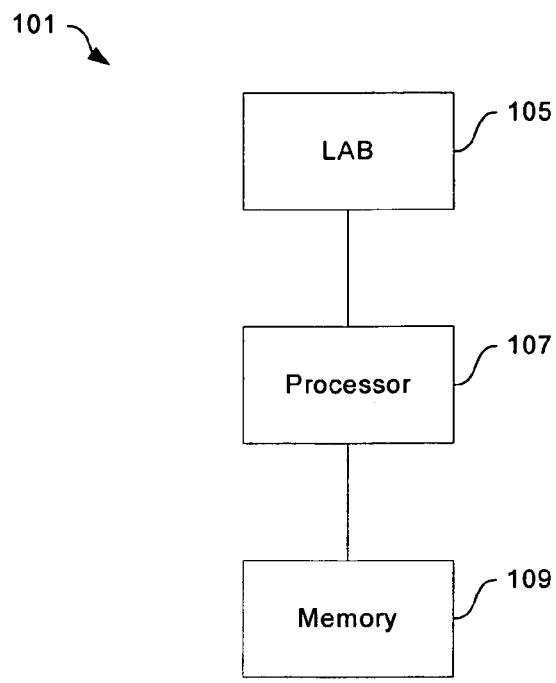
FIG. 1a illustrates a block diagram of an exemplary system architecture showing a luma adjustment block (LAB), in accordance with an embodiment of the present invention.

FIG. 1a illustrates a block diagram of an exemplary system architecture showing the LAB, in accordance with an embodiment of the present invention. Referring to FIG. 1a, the system 101 may comprise a LAB 105, a processor 107, and a memory 109. The processor 107 may be a host processor, for example. The LAB 105 may be utilized in the system 101, and may be associated with a video display in the system 101. The LAB 105 may comprise suitable logic, code, and/or circuitry that may be adapted to process video frames/fields. The LAB 105 may be utilized in a video network (VN). The processor 107 may comprise suitable logic, code, and/or circuitry that may be adapted to control the operation of the LAB 105 and to transfer control information and/or data to and from the memory 109. The memory 109 may comprise suitable logic, code, and/or circuitry that may be adapted to store control information, data, and information regarding video frames/fields.

The processor 107 may be capable of performing calculations associated with a video frame/video based on the luma values of an input image and making decisions based on calculated values. The decisions made by the processor 107 may be, for example, regarding the distribution of the luma values of the image and the contrast adjustment to be applied to the image. The decision may determine the amount of stretch to be applied to the distribution of the luma values based on the shape of the distribution, for example. The processor 107 may capture the image to memory before determining the distribution of its luma values and performing contrast stretching associated with the luma values of the image.

Figure 1B:
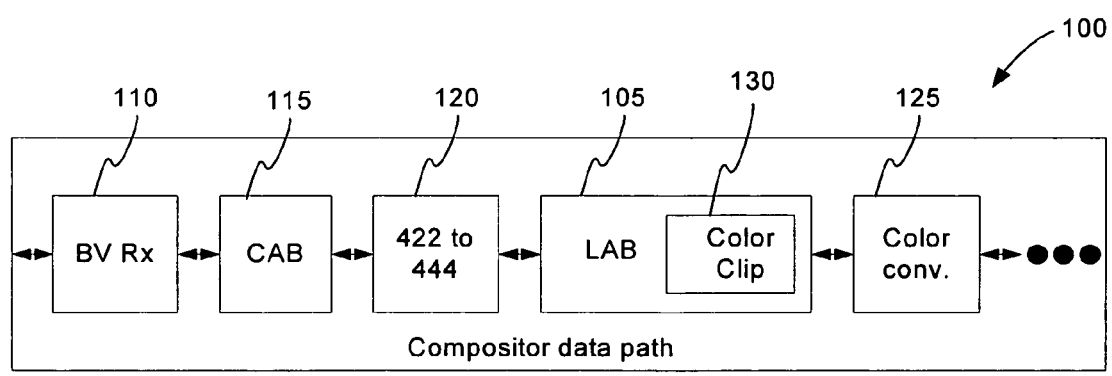
FIG. 1b illustrates a block diagram of an exemplary system utilizing the LAB of FIG. 1a, in accordance with an embodiment of the present invention.

FIG. 1b illustrates a block diagram of an exemplary system 100 utilizing a luma adjustment block (LAB) of FIG. 1a, in accordance with an embodiment of the present invention. The system 100 may be part of a video network system, and may perform functions associated with the chroma and luma of the images comprising an input video. The system 100 may comprise the LAB 105 and other components such as, for example, a video bus receiver 110, a color adjustment block (CAB) 115, a 4:2:2 to 4:4:4 conversion block 120, and a color conversion block 125. The LAB 105 may perform several functions, which may comprise, for example: mapping luma values of a video to new values using a look-up table, adjusting the color of the output video, color-clipping, and gathering histogram statistics for the video.

The LAB 105 may be instantiated in the compositor data path illustrated in FIG. 1b for a main window of a primary display. The LAB 105 may be adapted to use standard video bus interfaces as applicable to the compositor. The color-clip block 130 may be instantiated in the LAB 105 to save the complexity of another video bus interface.

Figure 2A:
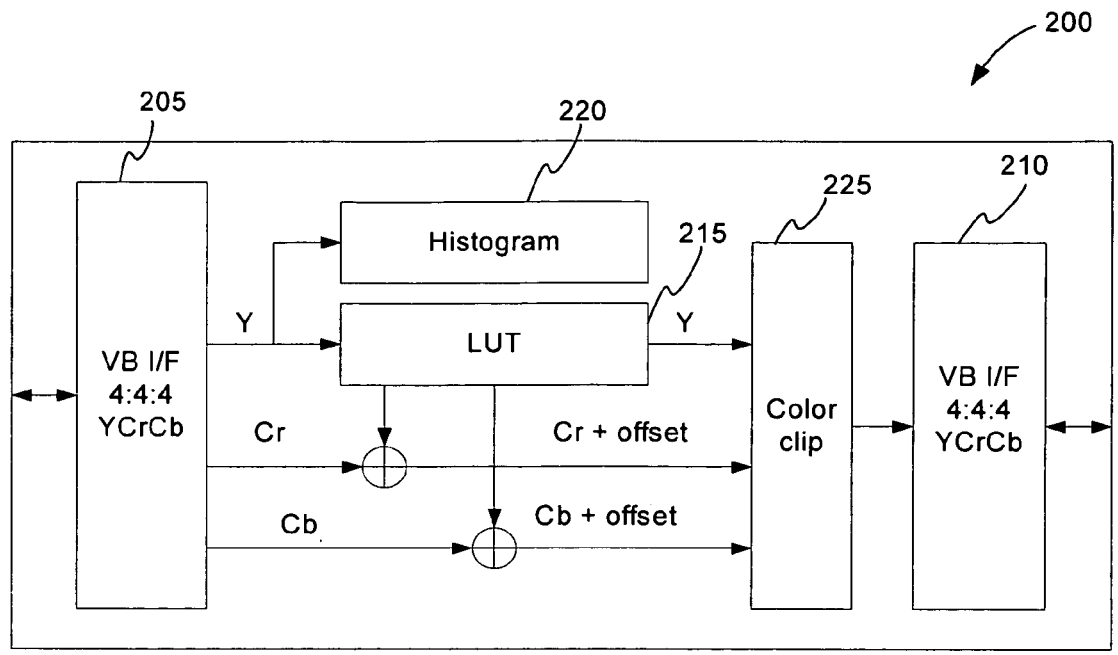
FIG. 2a illustrates an exemplary block diagram of a LAB, in accordance with an embodiment of the present invention.

FIG. 2a illustrates an exemplary block diagram of a LAB 200, in accordance with an embodiment of the present invention. The LAB 200 may be a detailed diagram of the LAB block 105 of the system 100 of FIG. 1b. The LAB 200 may comprise video bus interfaces 205 and 210, a histogram 220, a look-up table 215, and a color clip 225. The video bus (VB) interfaces 205 and 210 may be any applicable video bus interface. The VB interface 205 may be utilized for supplying frames/fields to the LAB 200 from other components of the video network of which the LAB 200 is a part. The VB interface 210 may allow output frames/fields that have been processed by the LAB 200 to be transferred throughout the video network. U.S. patent application Ser. No. 11/026,369, filed Dec. 30, 2004 illustrate an application of the video bus. Accordingly, U.S. patent application Ser. No. 11/026,369, filed Dec. 30, 2004 is hereby incorporated herein by reference in its entirety.

In accordance with an exemplary embodiment of the invention, the look-up table (LUT) 215 may comprise 256×20 bits. Each 20-bit entry may be configured as follows:

bits [19:14]=Cr offset [−32, 31]
bits [13:8]=Cb offset [−32, 31]
bits [7:0]=new Y value [0, 255]

The Cr, and Cb offsets may be added with signed, saturating arithmetic.

In an embodiment of the present invention, the LUT 215 may be programmable and it may be programmed during vertical blank intervals using register direct memory address (DMA). The LUT 215 may also be updated in real time by a host processor. In an exemplary embodiment of the present invention, a dual-port (2-port) random access memory (RAM) may be utilized to program the LUT 215 in real-time. The type of RAM used may be implementation-dependent.

The LAB 200 may comprise at least one control bit that may be utilized to enable or disable the LAB 200. In instances when the luma adjustment block is enabled or disabled, the LAB 200 may be configured so that it does not cause blurps on the display. The LAB 200 may be enabled or disabled according to viewer's selection based on whether the viewer desires to have contrast stretch applied to a video sequence or not.

The LAB 200 may be adapted to compute, for example, a histogram 220 of luma values over a selectable window [X1, Y1] to [X2, Y2]. The histogram 220 may comprise, for example, 16 bins. The selectable window may comprise a portion of the image extending from a horizontal position X1 to another horizontal position X2, and a vertical position Y1 to another vertical position Y2. In the selectable window, the LAB 200 may also determine minimum and maximum luma values. The histogram information, which may be gathered for each field or each frame, may be utilized to control the LUT values for black stretch and histogram equalization. At least one control bit, associated with a video stream, may be utilized to determine a mode associated with the histogram such as, for example, whether histogram information is gathered for each field or for each frame.

Histogram data or information may be accessible using a bus interface such as, for example, a RBUS. The histogram data or information may be organized so that software may access a consistent set of data. A histogram block may be provided, which may utilize a "pause" control to prevent updates while the host processor is reading a set of data.

Figure 2B:
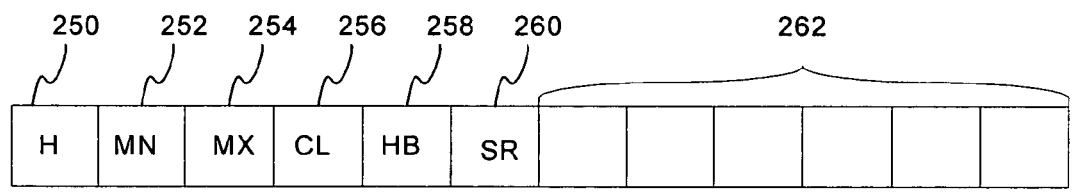
FIG. 2b illustrates an exemplary structure of histogram controls, in accordance with an embodiment of the present invention.

FIG. 2b illustrates an exemplary structure of histogram controls, in accordance with an embodiment of the present invention. The histogram controls may comprises registers such as, for example, a histogram control register (H) 250, min control register (MN) 252, max control register (MX) 254, at least one clear register (CL) 256, histogram bins register (HB) 258, and a status register (SR) 260. Other registers 262 may be utilized in addition to these exemplary registers.

The histogram control register 250 may be utilized to gather histogram statistics for 1 field, 2 fields, or pause. The histogram operation may be adapted to stop in the middle of a field if paused. The min and max control registers, 252 and 254, respectively, may be utilized to control gathering of min/max statistics for 1 field, 2 fields, forever, or pause. The min/max gathering may be adapted to stop in the middle of a field if paused. The at least one clear register 256 may be provided and may be controlled by software to clear the histogram bins or min/max bins. The histogram bins register 258 may be provided and may be controlled by software and used to read the values of the 16 histogram bins over the RBUS interface or other suitable interface. The status register 260 may also be controlled by software, where software may be able to determine a status of the histogram/min/max measurements, whether active or paused, from a register. In an exemplary embodiment of the present invention, the status register 260 may be kept separate from the control register 250.

In an exemplary embodiment of the present invention, the 4 MSbs of each luma value may be used as an index to one of the 16 histogram bins. For each luma value, the indexed bin may be incremented, if the pixel falls within the selected window. An exemplary supported window size may be 1920× 540×2 fields, which comprises up to 2,073,600 pixels. This may require at least a 21-bit register for each bin. A window of size 1280×720×2 frames is smaller and may require only 1,843,200 pixels. Other window sizes may also be utilized. At the end of the field or frame the histogram operation may pause until the host starts a new measurement.

The LAB 200 may also be adapted to compute the minimum and maximum luma values for a field or a frame. The min/max measurement may also be run continuously or may be paused. At the end of a field or frame measurement, the min/max operation may pause until the host processor starts a new measurement.

The LAB 200 may comprise a histogram function 220 that provides field-by-field statistics on the distribution of luma components within an image. The histogram function 220 may also provide the LAB LUT, which may translate luma values to other luma values. The processing in the system may read the histogram from one field, and dynamically process and apply a luma stretch of contrast to a following field.

The LAB 200 may support such functions as, for example, black stretch, dynamic contrast, and white stretch. While the following discusses the black stretch and dynamic contrast, it should be understood that the concepts as applied herein may be also applicable to white stretch. In various embodiments of the present invention, low contrast material may be stretched to increase contrast and high contrast material may not be modified. Additionally, the algorithm may dynamically adapt to incoming content and may have simple controls such as, for example, gain, on/off, and static black stretch.

The various embodiments of the present invention may provide higher quality video, which may be free from exemplary artifacts that may significantly impact overall scene brightness or color, and introduce banding or general softness. Other exemplary artifacts may comprise visibility of blooming or slow, broad changes in contrast or brightness at scene changes, and flash bulb images or fades. The various embodiments of the present invention may also be insensitive to noise, and may work similarly over a wide range of content such as, for example, dark scenes, light scenes, natural images, graphics, credits, stills, and moving images, without causing significant artifacts.

Figure 3:
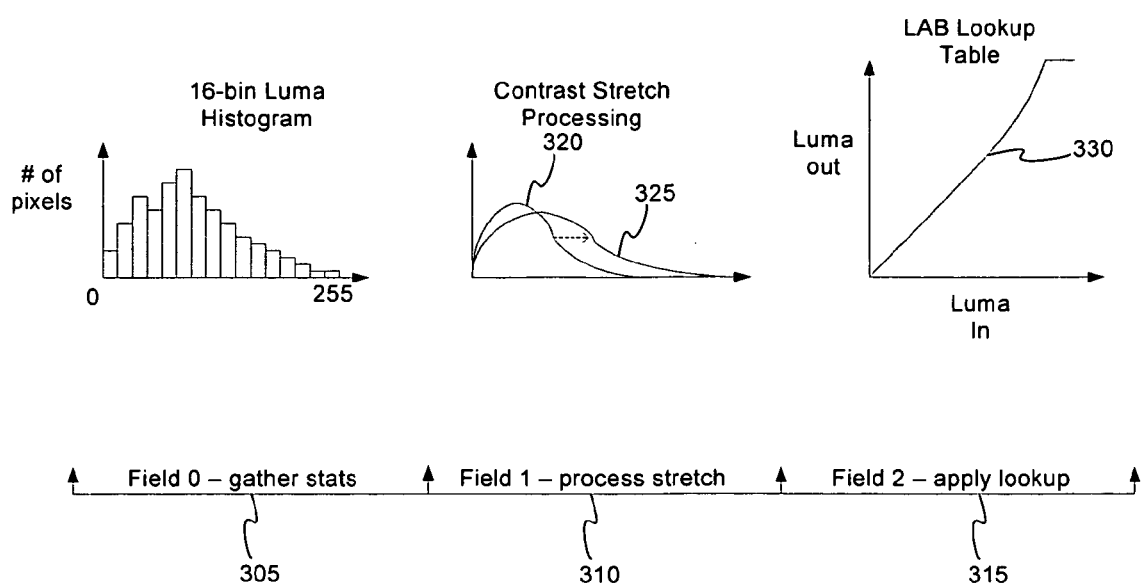
FIG. 3 illustrates an exemplary dynamic contrast stretch dataflow, in accordance with an embodiment of the present invention.

FIG. 3 illustrates an exemplary dynamic contrast stretch dataflow, in accordance with an embodiment of the present invention. The dynamic contrast stretch may be adapted to take place over 3 field times. Referring to FIG. 3, there is shown an initial field (0), 305, where the LAB may be utilized to gather histogram luma statistics in bins, which may, for example, be 16 bins. The luma value may range from 0 (black) to 255 (white). The luma histogram may represent the number of pixels in a certain range of luma values and store the corresponding number of pixels in the appropriate bin.

During the next field (1), 310, the host processor may read the histogram and process the contrast stretch algorithm in the LAB to create a LAB lookup table. The plot 320 may represent the distribution of the contrast of the original luma in an image, and the plot 325 may represent the desired distribution of the contrast for the luma of the output image. During the third field (2), 315, the created lookup table may then modify the original luma values to get the desired luma values according to the contrast stretch algorithm as described hereinafter. The exemplary graph 330 may show the mapping between the original luma values (luma in) and the desired luma values (luma out).

In an embodiment of the present invention, sampling of the luma histogram may occur every other field, and therefore, the LAB lookup table may be updated every other field. The most recent LAB lookup table may be used in contrast stretching to ensure that the input video receives continuous video processing. This process may be a dynamic process, where it may be completed within a field time.

Referring to FIG. 3, the contrast stretch process in field (1), 310, may utilize an algorithm developed based on the basic concepts of the human eye's response to luminance and the eye's adaptation to different scenes. The algorithm may comprise, for example, a function that estimates the distribution of luma (min, mid, max), a function that computes contrast stretch and the new distribution, and a function that constructs the LAB lookup table. The min may represent the smallest value of the luma distribution, which may be for example the luma value for the darkest pixel represented by the distribution, and the max may represent the largest value of the luma distribution, which may for example correspond to the luma value for the brightest pixel represented by the distribution. The mid may represent the luma value of the luma distribution where half of the pixels represented by the luma distribution correspond to luma values above the value of the mid, and the other half of the pixels may correspond to luma values below the value of the mid.

The function that computes the contrast stretch may utilize knowledge about the distribution of luma in a video image. The distribution of luma over an image may not be a normal distribution. Therefore, estimating the distribution based on a mean and standard deviation may be pointless in instances where there is a large amount of content. For example, credits in a video image comprise a very small amount of bright white, and the image may be predominantly black, so using a normal curve to estimate extremes may be meaningless. Extremes of the luma distribution minimum identify black levels in the image, and extremes of the luma distribution maximum generally identify specular white content in the image.

In a luma distribution, the 50% mid point may represent the overall scene brightness, and skew of the distribution may be used to determine whether the scene is predominantly dark content or bright content. For example, if the mid point is well below the middle of the max-min range, then the scene in the image may be predominantly a dark scene. However, if the mid point is above the middle of the max-min range, then the scene may be predominantly bright. Generally, difficulties in estimating the black and white levels in the distribution may be the result of noise. A small amount of noise may impact the tails of the narrow end of the distribution more than it affects the bulk of the middle of the distribution. Due to the impact of noise, it may be better to use a few data points from the histogram to average out noise, and to avoid basing the maximum decision on very few points of data.

Figure 4:
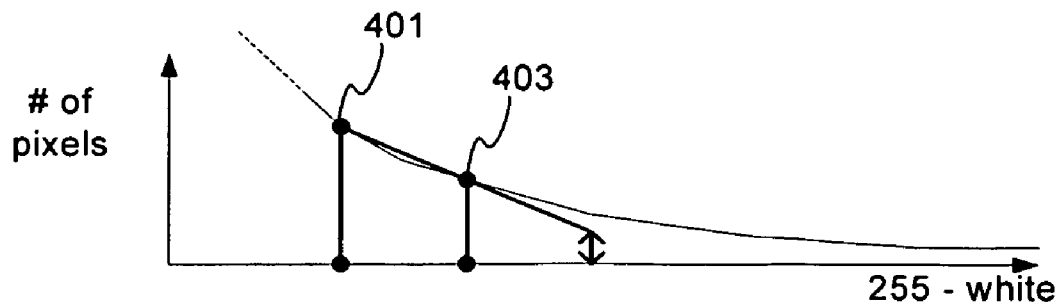
FIG. 4 illustrates an exemplary estimation of white levels, in accordance with an embodiment of the present invention.

FIG. 4 illustrates an exemplary estimation of white levels, in accordance with an embodiment of the present invention.

Referring to FIG. 4, there is shown a diagram, in which estimates of max and min are based on two data points, and the estimates comprise about 2-3% of pixels in a field. For example, using 97% or 98% percentile points, 401 and 403, respectively, of the distribution may yield a decent indication of the maximum of the white in a field as represented by 2-3% of the pixels in the field. Using more points such as, for example, the 95% percentile as the max may miss significant white objects. On the other hand, using few data point such as, for example, 99% percentile as the max may cause the system to be too sensitive to noise, and the entire computation may jump around in scene brightness based on noise. The same approach may be used to estimate the black level as well. With a skewed distribution, the impact of noise may have a noticeable effect only at the narrow end of the distribution.

In an exemplary embodiment of the present invention, a 3-field average of the max, min and mid point may be utilized, where the max, min, and mid point may be determined for each of 3 fields, and an average of the 3 max values may be utilized as the max value for all three fields, and similarly for each of the min and mid values. This may eliminate the effects of noise, and may not adversely affect the response time of the contrast stretch algorithm. The values for minimum and maximum may be computed, for example, assuming a linear distribution across the 16 luma levels within the bins. The 2%, 3%, 97%, and 98% points may be linearly interpolated within their bins to provide an estimate of actual location of the min and max.

The function that computes contrast stretch may use as inputs, for example, the min, max, and mid, and the function may treat every distribution as being modeled by these three points. The algorithm may use these values to compute various components of the contrast stretch. The components computed by the algorithm may comprise: linear stretch, fat-side limit, non-linear stretch based on skew, black level adjustment for near-black images, and chroma adjustment for stretched images, each of which is discussed hereinafter. The linear stretch and non-linear stretch may enhance the image, while the fat-side limit, black level adjustment and chroma adjustment may prevent artifacts and excessive stretching which may look unnatural.

Figure 5:
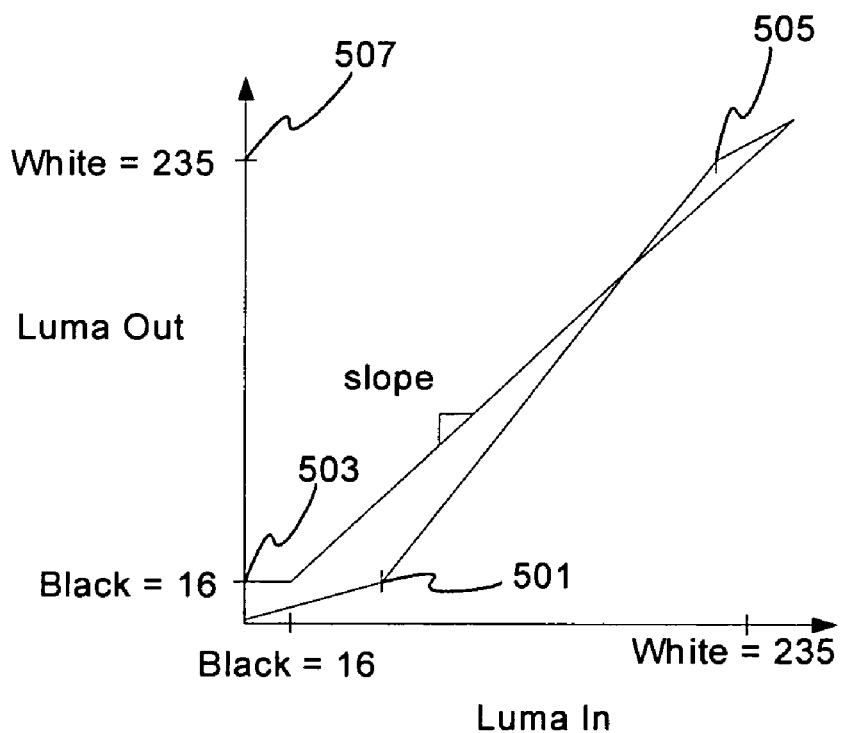
FIG. 5 illustrates an exemplary linear stretch, in accordance with an embodiment of the present invention.

FIG. 5 illustrates an exemplary linear stretch, in accordance with an embodiment of the present invention. The linear stretch may be computed by determining the minimum and maximum points in an image, and stretching the entire image, so that the min is pushed to black level, and the max is pushed to white level. Input levels beyond the min and max may be compressed into the region that is blacker than black and the region that is whiter-than white.

Referring to FIG. 5, the input luma values on the x-axis may be the input to the LAB block 105 of FIG. 1b, while the output luma values on the y-axis may be the output of the LAB block 105. The stretch operation may be a linear stretch to move the minimum point 501 to the black level 503 and the max point 505 to the white level 507. Referring to FIG. 5, the input values beyond the 1% min or 99% max may be pushed into the region blacker-than-black and whiter-than-white.

The approach illustrated by FIG. 5 may be an approach to contrast stretching that may utilize nominal processing, and may be generally sufficient for a lot of material. However for content, which may be very narrow in contrast, a different approach may be utilized.

An embodiment of the present invention may utilize a gain parameter or factor. The gain factor may be utilized to adjust the amount of stretch between the min and black or between the max and white. This may be applied as a percentage. For example, gain=1.0 may indicate a full stretch to black/white, while gain=0.5 may stretch half way from the min to black, and half way from the max to white. When the gain=0.0, this has no impact and no stretch may be performed.

Figure 6A:
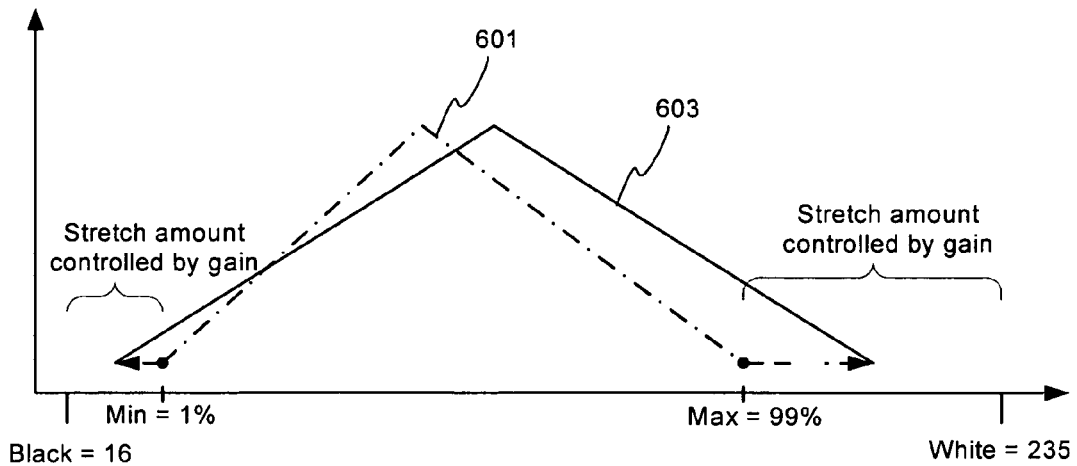
FIG. 6a is a graph illustrating an exemplary plot of a luma distribution using a gain factor, in accordance with an embodiment of the present invention.

FIG. 6a is a graph illustrating an exemplary plot of a luma distribution using a gain factor, in accordance with an embodiment of the present invention. The plot shows an input source histogram 601 (dotted line), with the resulting histogram at the output 603 (solid line) after the stretch. In the exemplary plot, the gain factor is set to 0.5. The gain factor may prevent the histogram from making major changes in extremes of contrast change from scene to scene. The gain factor may be also adjustable, and therefore the stretch of the contrast may be adjusted as desired. The minimum luma value may be stretched towards the smallest possible value by an amount equal to the gain, or:

new_min=min−gain(min−abs_min)

Where 0≦gain≦1, min is the minimum luma value, and abs_min may represent the value for the darkest black of the image. In some systems the darkest black value may be 16 instead of 0. Additionally, the min may not be the smallest luma value of the whole image; instead it may be the 1-percentile luma value.

The same may be done on the maximum side where the maximum luma value may be stretched towards the largest possible luma value by an amount equal to the gain, or:

new_max=max+gain(abs_max−max)

where 0≦gain≦1, max is the maximum luma value, and abs_max may represent the value for the whitest white of the image. In some systems the whitest white value may be 235 instead of 255. Additionally, the max may not be the largest luma value of the whole image; instead it may be the 99-percentile luma value.

The approach using a percentage shift from the min to black or max to white may adapt smoothly to changes in the input distribution. This approach may also provide the most desirable results on the widest array of source material as illustrated hereinafter.

Figure 6B:
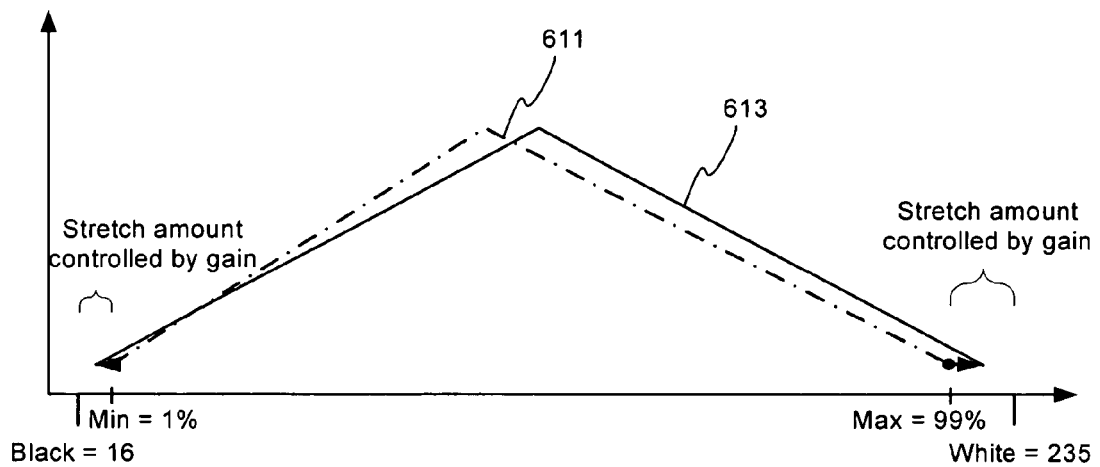
FIG. 6b is a graph illustrating the impact of a gain factor on an exemplary high contrast image, in accordance with an embodiment of the present invention.

FIG. 6b is a graph illustrating the impact of a gain factor on an exemplary high contrast image, in accordance with an embodiment of the present invention. The plot of FIG. 6b shows that high-contrast source images, represented by the input 611, may have very little stretch applied, and the overall impact may be small as can be illustrated by the output 613. This may be desirable since high-contrast content may require little change, since the sharpness may already be high. However, further stretch may be desired by viewers, in which case, the limits may be changed from 1%-99% to 5%-95% to cause further stretch. Alternatively, the limits of the abs_max and abs_min may also be changed from 16-235 to 0-255.

Figure 6C:
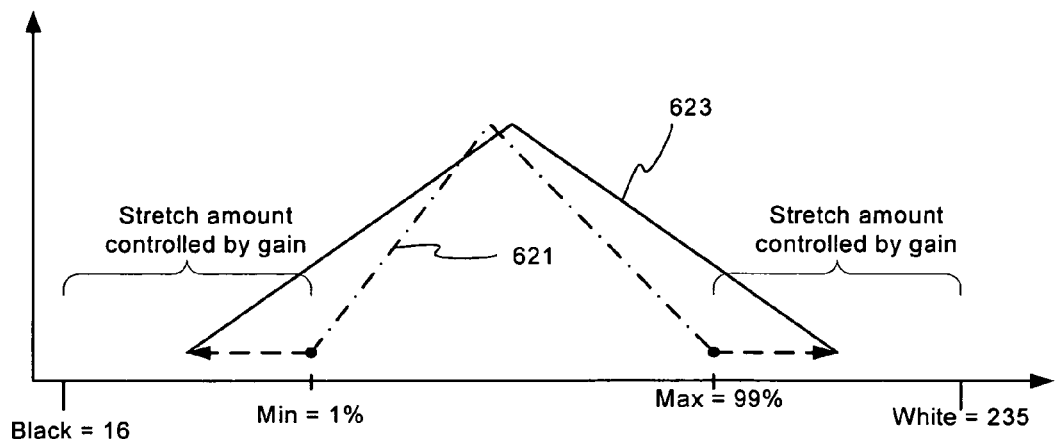
FIG. 6c illustrates the impact of a gain factor on an exemplary low contrast image, in accordance with an embodiment of the present invention.

FIG. 6c illustrates the impact of a gain factor on an exemplary low contrast image, in accordance with an embodiment of the present invention. The plot of FIG. 6c shows that a low contrast image, represented by the input 621, may be stretched with moderate gain that may prevent over-stretching the image to a full high contrast output 623. Gain values in the range of 0.5 to 0.8 may provide desirable results, where the contrast may not be stretched too much.

Figure 6D:
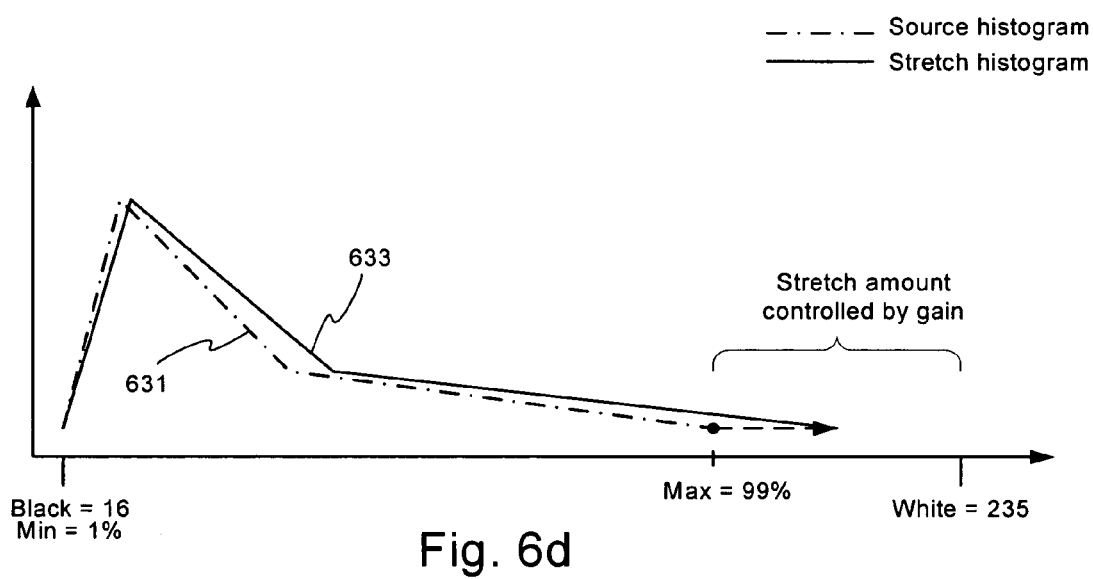
FIG. 6d illustrates the impact of a gain factor on an exemplary dark-skewed input image, in accordance with an embodiment of the present invention.

FIG. 6d illustrates the impact of a gain factor on an exemplary dark-skewed input image 631, in accordance with an embodiment of the present invention. The plot of FIG. 6d shows the impact of the percentage gain applied to the min and max. The dark image may give little or no stretch on the dark side, yet may still allow stretching contrast on the bright side of the image, as can be illustrated by comparing the distribution of the input 631 to the distribution of the output 633. This may have the effect of smoothly transitioning between scenes of different types, and may additionally have the affect that overall scene brightness is not altered, as dark regions in this source may remain largely unaffected. A similar effect may be seen on bright images, where changing overall brightness and stretching an image in a direction that would change the original intended composition of the source may not occur.

In an embodiment of the present invention, the fat-side limit may be utilized with skewed distribution, mostly dark or mostly bright scenes, to further restrict the contrast stretch. This may be mostly useful with low contrast images that are dark or bright. An example may be a scene of a foggy morning of low contrast. Without some limitations, this image may be overstretched, and the dark objects in the scene may be stretched too far, losing detail in dark areas. Some graphics images may also be low-contrast. Additionally this may be applicable in cases of machine-made images with bright blue text on white background. Such images may look sharp to the eye, but in actuality, does not span the entire region from black to white.

In algorithmic form, the fat-side limit approach may compare the midpoint-min to half-range (max−min)/2. If the distribution is balanced (unskewed) the mid-point is in the middle of the distribution, then the fat-side limit degenerates to simply half the range (max−min)/2, and:

$$FatsideMin = \mathrm{minimum}\left[(\mathrm{mid}50\% - \mathrm{min}1\%), \frac{(\mathrm{max}99\% - \mathrm{min}1\%)}{2}\right]$$

$$FatsideMax = \mathrm{minimum}\left[(\mathrm{max}99\% - \mathrm{mid}50\%), \frac{(\mathrm{max}99\% - \mathrm{min}1\%)}{2}\right]$$

where mid50% is the 50% percentile point in the luma distribution, max99% is the luma value above which lies only 1% of the pixels, and the min1% is the luma value below which lies only 1% of the pixels of the image.

The fat-side limits, FatsideMin and FatsideMax, may indicate the width of the histogram on the upper and lower side of the histogram. The fat-side limit may be used to constrain the contrast stretch algorithm so that the Min1% point may be stretched no further than the FatsideMin amount, and the Max99% may be stretched no further than the FatsideMax amount.

Figure 7A:
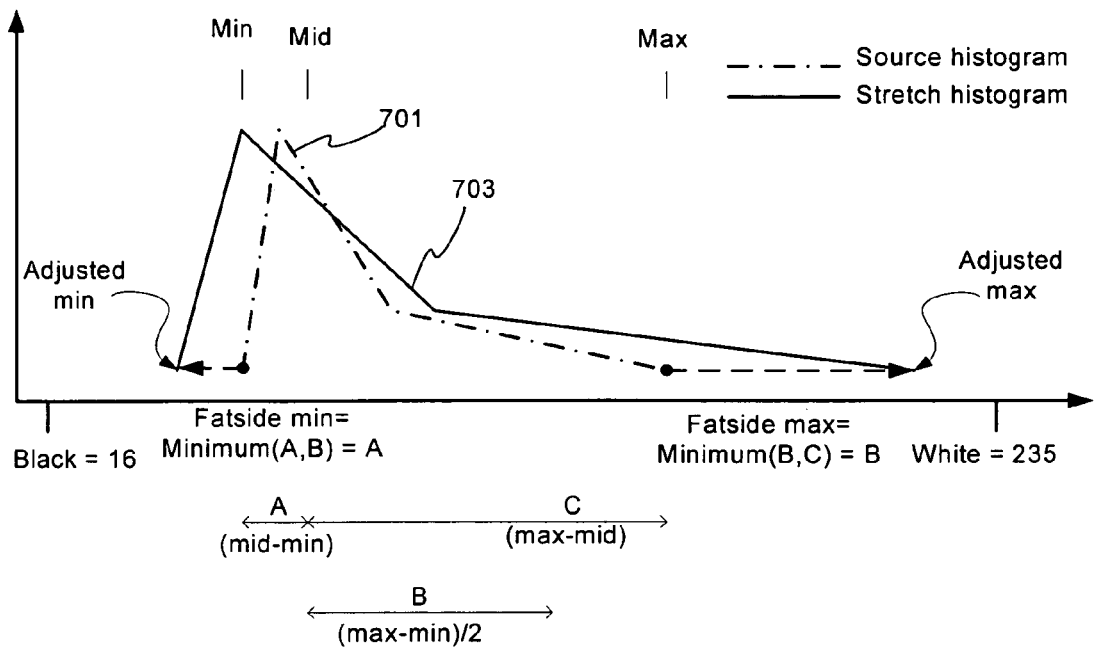
FIG. 7a illustrates an exemplary application of fat-side limits to contrast stretch, in accordance with an embodiment of the present invention.

FIG. 7a illustrates an exemplary application of fat-side limits to contrast stretch, in accordance with an embodiment of the present invention. The plot of FIG. 7a shows that the input distribution 701 (dotted line) may be skewed toward the dark side of the image. The distance from the minimum point (1%) to the mid point (50%) may be very small, implying a large number of dark pixels. The FatsideMin may be a reasonably small range. The contrast stretch may be setup in such a way that the image is stretched no further than the FatsideMin, resulting in the output distribution 703. This limiting function may be achieved by defining an adjusted minimum, AdjMin, and an adjusted maximum, AdjMax:

AdjMin=Min1%−FatsideMin*Gain

AdjMax=Max99%+FatsideMax*Gain where "Gain" may be a value from 0.0 to 1.0 set by a user parameter.

After the AdjMin and AdjMax points are defined, a linear stretch from AdjMin to AdjMax may be performed. Hence, the min1% point may be stretched to the AdjMin, and the max99% point may be stretched to AdjMax. This may avoid overstretching an image, and may also prevent overstretching on one-side of the distribution.

Figure 7B:
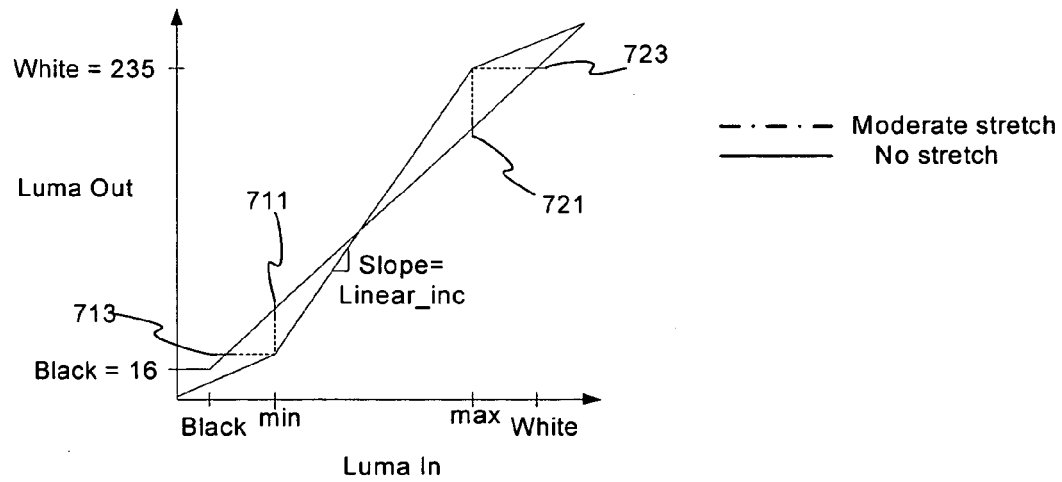
FIG. 7b illustrates using AdjMin and AdjMax to implement an exemplary stretch, in accordance with an embodiment of the present invention.

FIG. 7b illustrates using AdjMin and AdjMax to implement an exemplary stretch, in accordance with an embodiment of the present invention. The plot of FIG. 7b shows the effects of stretching the Min 711 out to the AdjMin point 713, and stretching the Max 721 out to the AdjMax point 723. Utilizing this approach may ensure preservation of the image and minimization of artifacts, which may be further explained as follows. This approach may prevent over-stretching the dark side of a dark image, or overstretching the bright side of a bright skewed image. A dark-skewed image, such as a nighttime scene may not have its brightness changed, but may stretch the white highlights within the image, giving the impression of sharper images and higher contrast. Narrow distributions comprising very low contrast images such as foggy scenery, or certain types of graphics, may be stretched very little, if at all. For example, if the entire distribution width (Max-Min) is 10 luma levels, the fat-side limits will stretch the Min by 5 levels, and will stretch the Max by 5 levels, resulting in a final distribution of 20 levels. This example assumes a gain of 1.0.

In an embodiment of the present invention, further enhancement to the stretch may be achieved by employing non-linear stretch. This may be achieved by first recognizing that the power law curve of the eye's response is not linear, nor is it constant. Generally in a dark room the eye is less sensitive to contrast, while in a light room the eye is more sensitive to contrast. In a bright room, the eye perceives a different relative contrast between two nearly black items when compared to viewing the same two near-black items in a dark room. Boosting white level contrast may have little or no effect in a bright room. However boosting the contrast near black may increase the overall contrast ratio.

In a dark room the perceived contrast between a flat white surface and a specular white reflection is usually compressed, and may be enhanced in dark scenes to give a better perception of contrast and sharpness. Additionally, boosting contrast near black may magnify noise in this area, which is often seen in MPEG encoded images as near-black moving noise, or as noise specks in general in analog signals. Boosting the contrast near white in dark scenes may increase the specular highlights and perceived sharpness.

These two enhancements, stretching white levels in dark scenes and stretching black levels in bright scenes, may be achieved by putting some curvature on the luminance response curve. Stretching white levels more in dark scene increases contrast and specular highlights, while stretching black levels more in a bright scene gives an impression of blacker-blacks and overall better contrast. Such a non-linear stretch may be most effective when applied to a skewed image, which is predominantly dark, or predominantly light.

Another way to view non-linear stretch is from the perspective of a power function from a camera to a display. For example, the power function of luminance is usually set for televisions at a power function of 1.25 (this assumes the display is power function 2.5 gamma, and a dim viewing environment). For lighter viewing environments such as an office, the end-to-end power function is usually 1.125, and for darker viewing environments such as cinema the end-to-end power function is 1.5 for best viewing. In a large-screen application, where the brightness of the room and of the viewer is dominated by the brightness of the screen, the power function may be adjusted based on the scene contents. For bright scenes, the curvature of the luminance curve may need to be reduced to reduce the end-to-end power function. For dark scenes, the curvature of the luminance curve may need to be increased. This may be achieved by increasing the contrast stretch for near-white pixels in dark scenes, and by increasing contrast stretch for near-black pixels in bright scenes. To detect these types of scenes, a skew factor may be computed, which may be a percentage measure of how far the Mid50% point lies from the middle of the Max-Min range.

Figure 8A:
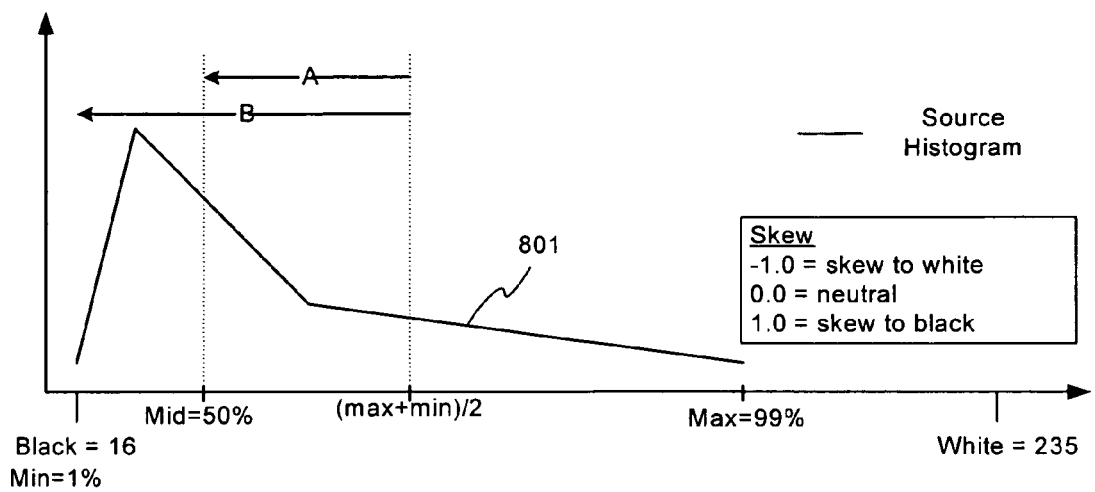
FIG. 8a is a graph illustrating an exemplary estimation of skew, in accordance with an embodiment of the present invention.

FIG. 8a is a graph illustrating an exemplary estimation of skew, in accordance with an embodiment of the present invention. Referring to FIG. 8a, the skew of a distribution 801 is given by:

$$\text{Skew} = A/B$$
$$= [(\text{Max} - \text{Min})/2 - \text{Mid}]/(\text{Max} - \text{Min})/2$$

The plot of FIG. 8a shows that highly skewed distributions may produce a large Skew value. In the extreme, the Skew will be −1 for an image which has half of it's points at the Max99% luma value, and the Skew will be 1.0 for an image skewed all the way to Min1% point. The Skew parameter may not exceed the −1.0 to 1.0 range.

The Skew parameter may be used to inject a second-order curvature to the linear stretch. This may be accomplished by adding a small delta slope to the slope of the linear stretch at each step.

Figure 8B:
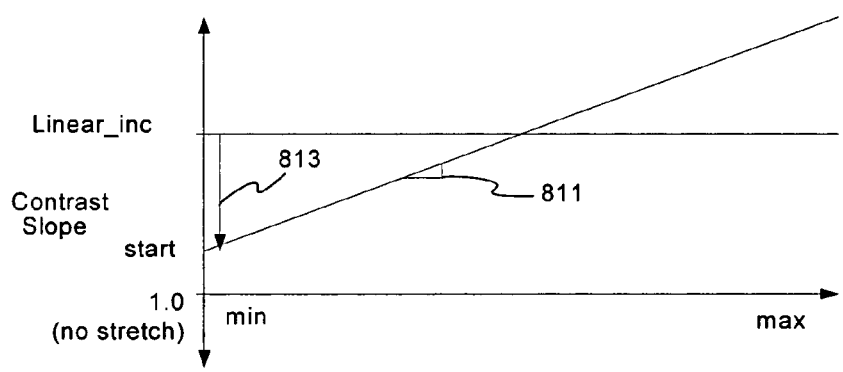
FIG. 8b is a graph illustrating an exemplary computation of delta based on the Skew, in accordance with an embodiment of the present invention.

FIG. 8b is a graph illustrating an exemplary computation of delta based on the Skew, in accordance with an embodiment of the present invention. Referring to FIG. 8b, the computation of the value delta, 811, may be based on the amount of skew, 813, in an image. Starting from the linear increment (slope) of the original stretch, the Skew, 813, may be used to compute a second order slope on top of the linear stretch. A table (described below) may be created where each table entry may be computed based on a simple increment from the previous value in the table. The Delta may be added to the increment at every step in the table, thereby achieving larger steps for pixels near Max99% in dark scenes (shown in FIG. 8b). Similarly, the added Delta may be reversed for bright scenes, resulting in larger steps for pixels near Min1% in bright scenes. Limits may also be checked to ensure that the increment between each luma step is always greater or equal to 1.0. This may be maintained to prevent banding.

Figure 9:
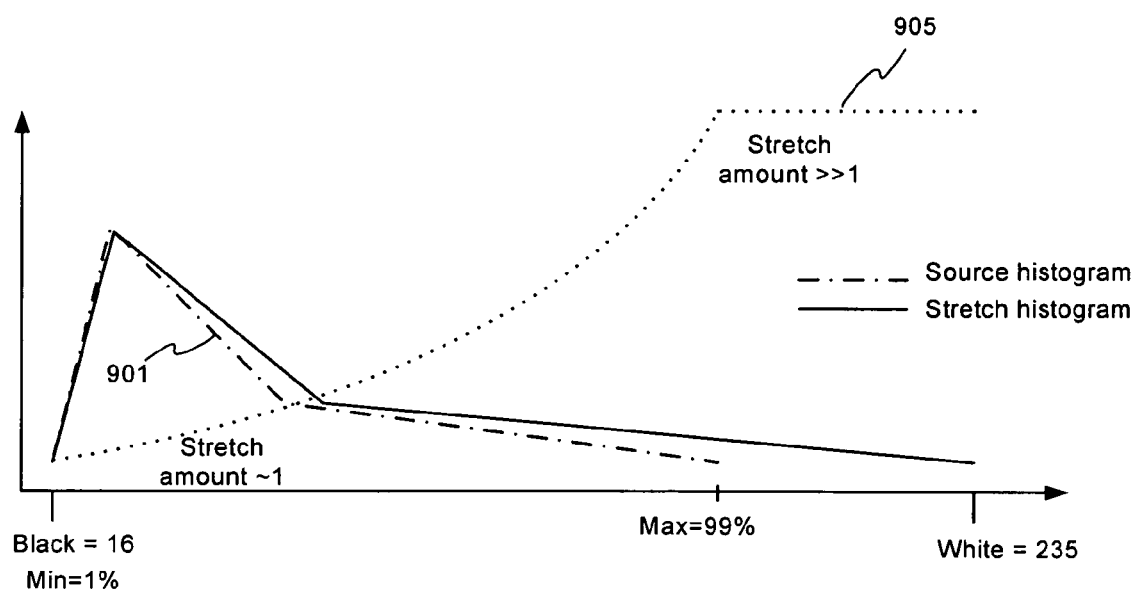
FIG. 9 is a graph illustrating an exemplary overall effect of using non-linear stretch, in accordance with an embodiment of the present invention.

FIG. 9 is a graph illustrating an exemplary overall effect of using non-linear stretch, in accordance with an embodiment of the present invention. Referring to FIG. 9, there is shown an overall effect of both the histogram adjustment, and the Luma in-out transfer function for a skewed input image 901 with the Delta adjustment providing the Non-linear stretch as described hereinabove and illustrated by the curve 905.

In an embodiment of the present invention, there may be two adjustments made in regard to the black level and near-black levels. The first adjustment may be a constant black-level stretch, which may be used for simple black stretch algorithms. The second may be an adaptive change to the linear stretch for images that may have blacker-than-black histogram minimums (Min1%<16).

In images where the Min1% is above black, a normal linear stretch may easily accommodate and stretch the image to approach black. However, in images where the Min1% is below black, there may be some desire to stretch these images some amount, but it may be done in such a way that the black level is not raised. This may be done by examining the slope of the linear stretch, and creating a stretch point AdjMin such that black levels remain black, while still providing some stretch for a few luma values less than black. The following algorithm may be used:

```
If (Min1% < Black)
{
    Min1% = Black;
    AdjMin = Black − LinearIncrement;
}
``` where, LinearIncrement may be the slope of the Luma-in to Luma-out transfer curve, and also the magnitude of the contrast stretch multiplier. This equation may force a stretch from Black input pixels to something slightly less than Black. The higher the total stretch amount, the more stretch of near-black pixels below black. For a relatively extreme stretch of 2×, the Black input 16 may be output at 14, while an input of 17 may be output at 16, and an input of 18 may be output at 18, and the stretch continues up from that point.

After the AdjMin value is computed, the total stretch amount may be recomputed. Values less than AdjMin may be slightly compressed to allow for the stretch function, but may mostly remain unchanged. The second black level adjustment may be simply an integer black stretch that basically stretches the entire image toward black by a fixed amount selected by the viewer. This may be computed using the following:

$$AdjMin = AdjMin - BlackStretch$$

where BlackStretch may be a static parameter representing the amount of luma stretch, where the 0<BlackStretch<AdjMin.

In an embodiment of the present invention, this black level adjustment may be applied to the linear stretch. For example, if the user sets Gain=0 and BlackStretch=4 then the overall image will be stretched from (Min1%−4) to Max99%. The net total effect is to push the overall image more into the black region and increase contrast by making more pixels black. This may be a simple effect that works well on bright scenes. The static BlackStretch parameter of the above equation may be used in addition to the dynamic contrast stretch with a gain>0.0.

Another adjustment may be made to adapt the overall change in brightness to a viewer's eye's expected behavior: chroma adjustment. The human eye expects brighter scenes to contain more saturated colors, while darker scenes suffer a loss of color. Taken to the extreme, typically the human eye is not as sensitive to color in a very dark room, or simply put, the human eye has difficulty discerning different colors or discerning the amount of color.

When adjustments are made to increase the brightness of a scene, even slightly, the effect on chroma leaves colored objects looking washed-out and pastel looking. The increase in brightness therefore may be accompanied with an increase in saturation to keep the balance of colors preserved relative to the new brightness of the image. In order to compute the overall change in brightness, the algorithm may calculate the new Mid point based on the contrast stretch as applied to the measured Mid50% point. This new Mid point is termed the AdjMid:

$$AdjMid=(Mid50\%-Min1\%)*LinearIncrement+AdjMin$$

The further this Adjusted Mid point deviates from the original histogram Mid50% point, the larger the change in overall scene brightness. This percentage change in brightness may be applied to Chroma saturation, utilizing the color space converter 125 in the Compositor data path 100 of FIG. 1b.

The LAB table may be constructed incrementally over three regions: near black, stretch region, and near-white. In the near-black region (from 0 to Min) the table may be filled with each value incremented by an amount:

$$Inc=AdjMin/Min$$

In the stretch region (from Min to Max) the table may be filled with each value incremented by an amount:

$$LinearIncrement=(Max-Min)/(AdjMax-AdjMin)$$

$$Inc=LinearIncrement$$

And at each step:

$$LinearIncrement+=Delta$$

This may achieve the linear stretch plus the non-linear stretch described above.

In the near-white region (from Max to 255) the table may be filled with each value incremented by an amount:

$$Inc=(255-AdjMax)/(255-Max)$$

The algorithm of the present invention may therefore use multiple sample points and fields, which may ensure noise-free minimum and maximum. The algorithm may also use a linear stretch from min to max to adapt to a wide-ranging image distribution and use a fat-side limit to prevent over-stretching narrow distribution images. Additionally, the algorithm may use a fat-side limit to prevent over-stretching one side of a skewed distribution image, use skew to measure overall scene brightness or darkness, use the skew metric to perform a non-linear stretch to adapt to the eye response in dark scenes and bright scenes, and use the skew to provide a second order delta function that may be simple to compute to create the non-linear stretch.

Other embodiments of the present invention may use more bins in the histogram and use exponential function for non-linear stretch. In addition, other embodiments may also average bins over time to remove noise from estimates of min/max, and 1-skew^2 to limit the impact of skew on non-linear stretch. Furthermore, other embodiments may average minimum+half-range to use for fat-side limit, and use a hard limit on the fat-side limit to ensure the fat-side limit is not smaller than 10 luma levels.

In an embodiment of the present invention, a specific filter may be utilized to detect very skewed very dark images, such as credits, and filter out MPEG motion macroblock artifacts near black. A feature may also be provided to increase the percentage bins to 1%, 2%, 3%, 4%, etc at very high levels of contrast stretch for setting the Min point. This may stretch even normal material and provide much higher contrast.

Figure 10:
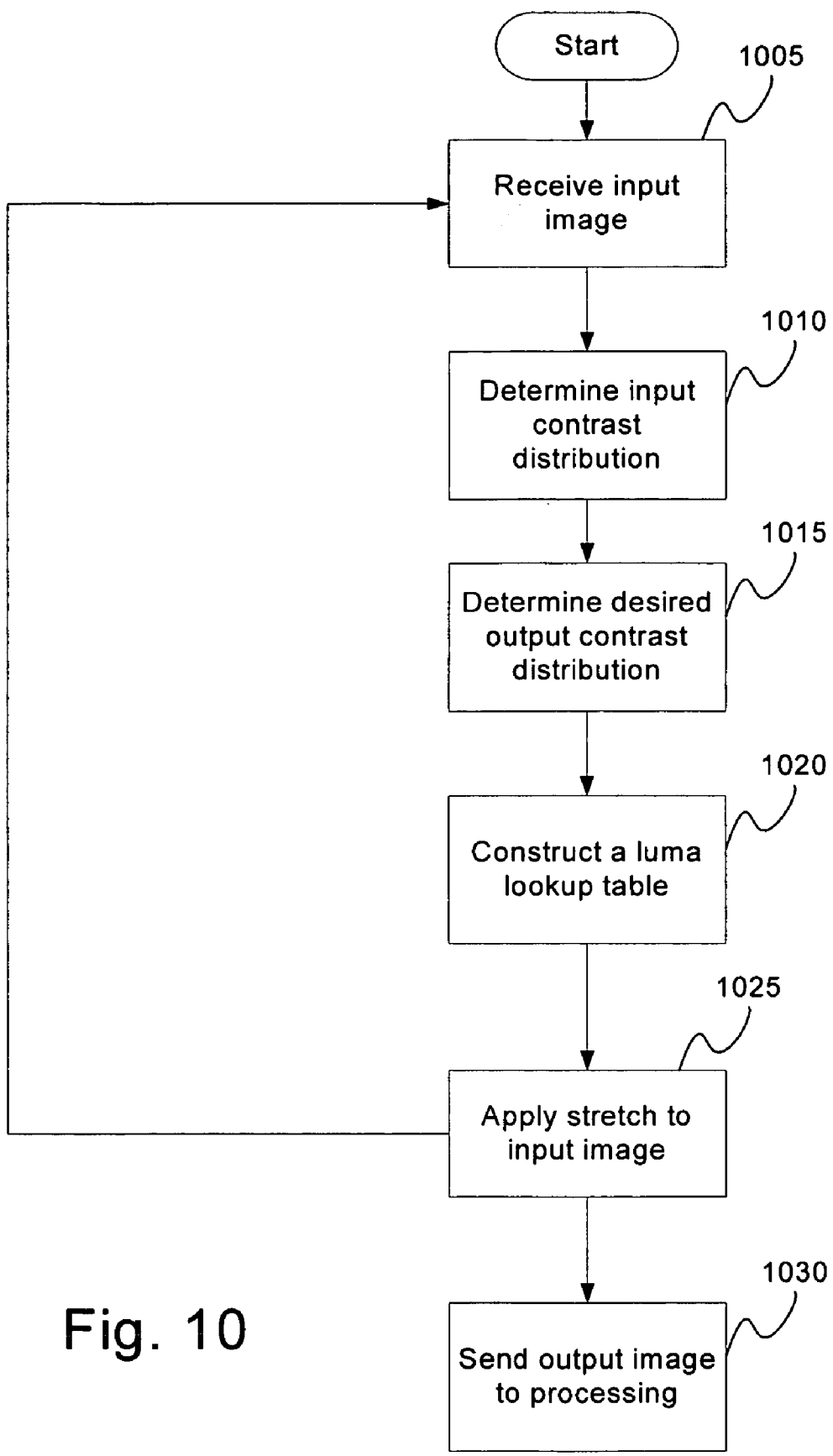
FIG. 10 illustrates a flow diagram of the method for dynamic contrast stretch, in accordance with an embodiment of the present invention.

FIG. 10 illustrates a flow diagram of the method for dynamic contrast stretch, in accordance with an embodiment of the present invention. Referring to FIG. 10, at a step 1005, an input image may be received by system hardware such as, for example, the LAB 105 of FIG. 1b. At a next step 1010, the contrast distribution of the input image may be determined by using the min, max, and mid point of the luma values in the received image. A stretch contrast distribution may then be determined by applying an appropriate stretch to the contrast distribution of the input image, at a step 1015. The applied stretch may be determined based on the shape of the contrast distribution of the input image. For example, for a skewed distribution, where the image may be predominantly dark or predominantly bright, less stretch may be applied to the predominant side and more stretch may be applied to the other side. Hence, a darker image with a distribution that is "fat" in the region around small luma values, the "fat" side may have little stretch applied, whereas, the region around large luma values may have large stretch applied.

At a next step 1020, a lookup table may be constructed from the input and output contrast distributions, with the input luma values and the corresponding luma values. The lookup table may then be applied to the image by mapping the luma values in the input image to the corresponding output luma values from the lookup table, at a next step 1025, hence stretching the contrast of the input image. The process may then repeat by retrieving the next input image at step 1005. Meanwhile, the stretched output image may be sent to further processing such as, for example, a display engine, at a step 1030.

Accordingly, the present invention may be realized in hardware, software, or a combination thereof. The present invention may be realized in a centralized fashion in at least one computer system, or in a distributed fashion where different elements may be spread across several interconnected computer systems. Any kind of computer system or other apparatus adapted for carrying out the methods described herein may be suited. A typical combination of hardware and software may be a general-purpose computer system with a computer program that, when being loaded and executed, may control the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing an image, the method comprising stretching contrast of an input image, by a circuit, based on a distribution of luma values for said input image, wherein only pixels in the input image that are within a first range of distribution of luma values for said input image are modified such that the distribution of luma values is expanded for a desired output image; and wherein the distribution of luma values is expanded to a second range of distribution of luma values within an adjusted minimum and an adjusted maximum, the adjusted minimum and the adjusted maximum being determined based at least in part on a median in the distribution of luma values and a gain factor.

2. The method according to claim 1, further comprising:
constructing a lookup table comprising desired output luma values for said desired output image; and
stretching a contrast of said input image based on said constructed lookup table.

3. The method according to claim 1, further comprising applying a linear function to said distribution of luma values for said input image in order to generate said distribution of luma values for said desired output image.

4. The method according to claim 1, further comprising:
applying a linear stretch to a minimum value of the distribution of luma values, wherein the linear stretch comprises stretching the minimum value to a new minimum value, and wherein the new minimum value is between the minimum value and a value associated with black; and
applying a linear stretch to a maximum value of the distribution of luma values, wherein the linear stretch comprises stretching the maximum value to a new maximum value, and wherein the new maximum value is between the maximum value and a value associated with white.

5. The method according to claim 4, if the distribution of luma values comprises a narrow distribution, further comprising:
adjusting the value associated with black to a larger value; and
adjusting the value associated with white to a smaller value.

6. A non-transitory computer readable medium having stored thereon, a computer program having at least one code section for processing an image, the at least one code section being executable by a machine for causing the machine to perform steps comprising stretching contrast of an input image based on a distribution of luma values for said input image, wherein only pixels that are within a first range of distribution of luma values for said input image are modified such that the distribution of luma values is expanded for a desired output image; and wherein the distribution of luma values is expanded to a second range of distribution of luma values within an adjusted minimum and an adjusted maximum, the adjusted minimum and the adjusted maximum being determined based at least in part on a median in the distribution of luma values, a midpoint in the first range of distribution of luma values, and a gain factor.

7. The non-transitory computer readable medium according to claim 6, wherein the code for stretching the contrast of the image comprises:
code for constructing a lookup table comprising desired output luma values for said desired output image; and
code for stretching a contrast of said input image based on said constructed lookup table.

8. The non-transitory computer readable medium according to claim 6, further comprising code for applying a linear function to said distribution of luma values for said input image in order to generate said distribution of luma values for said desired output image.

9. The non-transitory computer readable medium according to claim 6, further comprising code for:
applying a linear stretch to a minimum value of the distribution of luma values, wherein the linear stretch comprises stretching the minimum value to a new minimum value, and wherein the new minimum value is between the minimum value and a value associated with black; and
applying a linear stretch to a maximum value of the distribution of luma values, wherein the linear stretch comprises stretching the maximum value to a new maximum value, and wherein the new maximum value is between the maximum value and a value associated with white.

10. The non-transitory computer readable medium according to claim 9, if the distribution of luma values comprises a narrow distribution, further comprising:

code for adjusting the value associated with black to a larger value; and code for adjusting the value associated with white to a smaller value.

11. A system for dynamically stretching contrast of an image, the system comprising at least one processor that stretches contrast of an input image based on a distribution of luma values for said input image, wherein only pixels that are within a first range of distribution of luma values for said input image are modified such that the distribution of luma values is increased for a desired output image; and wherein the distribution of luma values is increased to a second range of distribution of luma values within an adjusted minimum and an adjusted maximum, the adjusted minimum and the adjusted maximum being determined based at least in part on a midpoint in the first range of distribution of luma values and a gain factor.

12. The system according to claim 11, wherein:

said at least one processor constructs a lookup table comprising desired output luma values for said desired output image; and said at least one processor stretches a contrast of said input image based on said constructed lookup table.

13. The system according to claim 11, wherein said at least one processor applies a linear function to said distribution of luma values for said input image in order to generate said distribution of luma values for said desired output image.

14. The system according to claim 11, further comprising:

said at least one processor applies a linear stretch to a minimum value of the distribution of luma values, wherein the linear stretch comprises stretching the minimum value to a new minimum value, and wherein the new minimum value is between the minimum value and a value associated with black; and said at least one processor applies a linear stretch to a maximum value of the distribution of luma values, wherein the linear stretch comprises stretching the maximum value to a new maximum value, and wherein the new maximum value is between the maximum value and a value associated with white.

15. The system according to claim 14, if the distribution of luma values comprises a narrow distribution, further comprising:

said at least one processor adjusts the value associated with black to a larger value; and said at least one processor adjusts the value associated with white to a smaller value.

16. The method of claim 1, further comprising determining a fatside minimum limit and a fatside maximum limit based at least in part on the median in the distribution of luma values and a midpoint in the first range of distribution of luma values, wherein the adjusted minimum is determined based at least in part on the fatside minimum limit, and the adjusted maximum is determined based at least in part on the fatside maximum limit.

17. The method of claim 1, further comprising obtaining a specification of the gain factor from a user.

18. The method of claim 1, further comprising:

obtaining the input image from an input video signal; and generating an output video signal comprising the desired output image.

19. The non-transitory computer readable medium of claim 6, wherein the at least one code section causes the machine to perform steps further comprising determining a fatside minimum limit and a fatside maximum limit based at least in part on the median in the distribution of luma values and the midpoint in the first range of distribution of luma values, wherein the adjusted minimum is determined based at least in part on the fatside minimum limit, and the adjusted maximum is determined based at least in part on the fatside maximum limit.

20. The non-transitory computer readable medium of claim 6, wherein the at least one code section causes the machine to perform steps further comprising obtaining a specification of the gain factor from a user.

21. The non-transitory computer readable medium of claim 6, wherein the at least one code section causes the machine to perform steps further comprising:

obtaining the input image from an input video signal; and generating an output video signal comprising the desired output image.

22. The system of claim 11, wherein the at least one processor further determines a fatside minimum limit and a fatside maximum limit based at least in part on a median in the distribution of luma values and the midpoint in the first range of distribution of luma values, wherein the adjusted minimum is determined based at least in part on the fatside minimum limit, and the adjusted maximum is determined based at least in part on the fatside maximum limit.

23. The system of claim 11, wherein the at least one processor further obtains a specification of the gain factor from a user.

24. The system of claim 11, wherein the at least one processor further obtains the input image from an input video signal and generates an output video signal comprising the desired output image.

* * * * *